(12) United States Patent
Pecora

(10) Patent No.: US 8,020,239 B2
(45) Date of Patent: Sep. 20, 2011

(54) VEHICLE WHEEL/TIRE CLEANING DEVICE

(75) Inventor: Daniel Pecora, Palatine, IL (US)

(73) Assignee: Erie Brush & Manufacturing Corp., Chicago, IL (US)

( * ) Notice: Subject to any disclaimer, the term of this patent is extended or adjusted under 35 U.S.C. 154(b) by 0 days.

(21) Appl. No.: 12/572,447

(22) Filed: Oct. 2, 2009

(65) Prior Publication Data

US 2011/0078865 A1  Apr. 7, 2011

(51) Int. Cl.
*B60S 3/00* (2006.01)
(52) U.S. Cl. ............. 15/53.4; 15/53.2; 15/53.3; 15/97.3
(58) Field of Classification Search ............... 15/53.4, 15/53.2, 53.3, 97.3
See application file for complete search history.

(56) References Cited

U.S. PATENT DOCUMENTS

| | | | |
|---|---|---|---|
| 1,412,732 A * | 4/1922 | Young | 15/53.4 |
| 2,754,531 A * | 7/1956 | Rowland | 15/183 |
| 3,048,866 A * | 8/1962 | Thompson | 15/53.4 |
| 3,167,800 A * | 2/1965 | Mundo | 15/179 |
| 3,199,134 A * | 8/1965 | Jones | 15/3.16 |
| 3,662,417 A * | 5/1972 | Fuhring et al. | 15/53.4 |
| 3,761,986 A * | 10/1973 | Rickel | 15/53.3 |
| 3,869,833 A * | 3/1975 | Belanger | 451/469 |
| 3,930,276 A * | 1/1976 | Van Brakel | 15/53.4 |
| 3,939,521 A * | 2/1976 | Clark | 15/179 |
| 4,377,878 A * | 3/1983 | Pecora | 15/97.3 |
| 4,658,460 A * | 4/1987 | Edoardo | 15/182 |
| 4,756,044 A * | 7/1988 | Clark | 15/182 |
| 4,916,771 A * | 4/1990 | Weigele | 15/53.4 |
| 5,167,044 A * | 12/1992 | Belanger et al. | 15/4 |
| 5,857,238 A * | 1/1999 | Jmill | 15/256.5 |
| 6,260,225 B1 * | 7/2001 | Bowman | 15/53.4 |
| 7,152,269 B1 * | 12/2006 | Windel | 15/181 |

* cited by examiner

*Primary Examiner* — Shay Karls
(74) *Attorney, Agent, or Firm* — Michael P. Mazza, LLC

(57) ABSTRACT

A tire and wheel washing apparatus for cleaning exterior surfaces of tire and wheel combinations of a vehicle as the vehicle is conveyed past the apparatus. The tire washing apparatus preferably includes a longitudinally-extending cleaning element rotating about a shaft having a longitudinal axis extending generally parallel to the conveyed direction of the vehicle. The cleaning element is adapted to clean the exterior surfaces of tire and wheel combinations of the vehicle, and preferably has an undulating cleaning surface with a repeating pattern of a peak portion followed by a valley portion. Preferably, an intermediate portion located between the peak and valley portions has a substantially curvilinear edge surface.

18 Claims, 7 Drawing Sheets

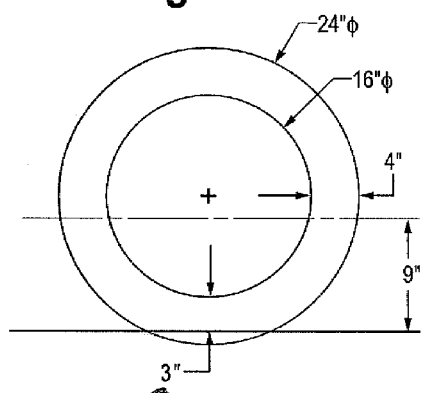
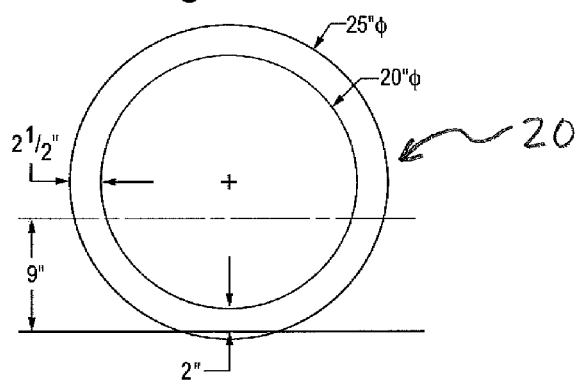
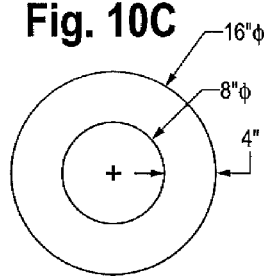
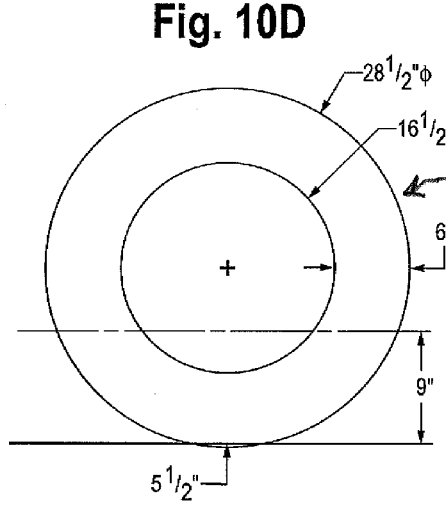
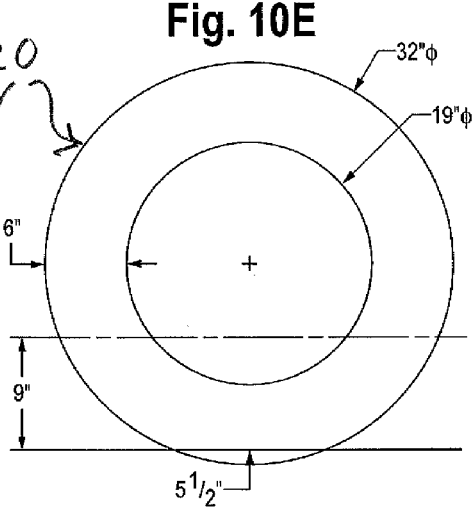

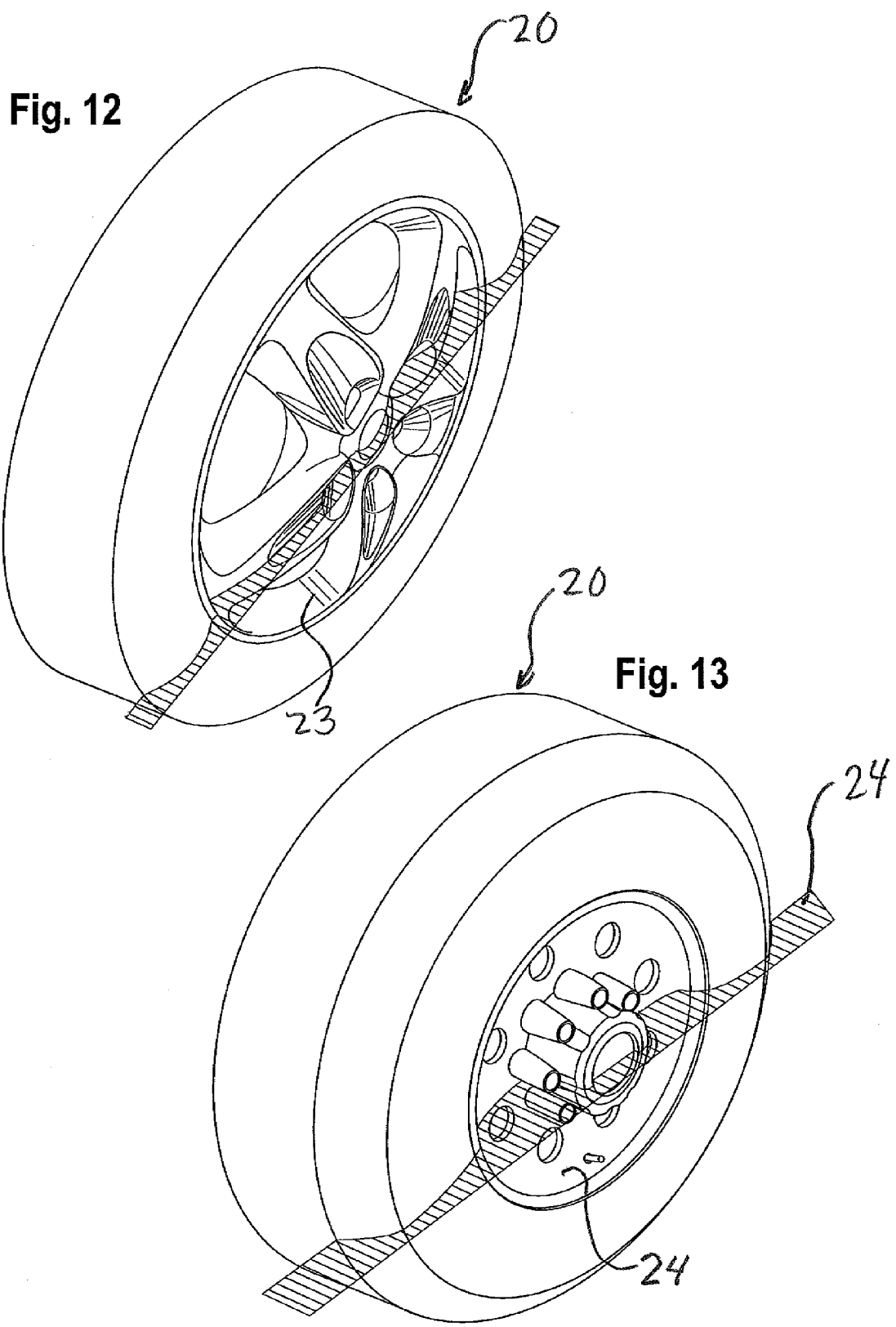

VEHICLE WHEEL/TIRE CLEANING DEVICE

BACKGROUND OF THE INVENTION

The invention relates to an improved vehicle washing apparatus for use in automatic car washes which clean the outside of the vehicle wheels and tires, and rocker panels.

In the context of automatic car washes, various vehicle wheel and/or tire washing devices are known. (Here reference to the "tire" is to the rubber portion of the wheel/tire combination, while reference to the "wheel" is to the metal "rim" portion mounted to the vehicle axle. The tire is usually attached to the wheel in typical fashion using a bead sealer.) One known device for washing the exterior surfaces of the wheel and tire combination employs a stationary frame 19 which may be bolted to the ground, pivotably attached to moveable frame members 22 connected to a rotating brush frame 16. Rotating brush frame supports brush axis 14 about which rotating brushes 12 spin. Brush axis 14 has a longitudinal axis aligned with the vehicle length, as shown in FIGS. 1-1A. As the vehicle to be washed is conveyed past the rotating brush, with tires 20 in conveyor track 26, cleaning fluid from hose 18 may be discharged onto the outside of its wheels/tires and/or the rotating brush, and the rotating brush then contacts and cleans the outside surfaces of the tire 20 and wheel 23. Larger diameter rotating brushes may also clean the rocker panels of vehicles, as well. (When reference to tire and wheel cleaning is made here, it is understood that cleaning of the rocker panel, where applicable, is also meant to be included.) Upper portions of the vehicle may be washed with overhanging equipment carried by frame 27, for example.

Still referring to FIGS. 1 and IA, shock absorber 17 attached to support 22 may be used to absorb contact of the wheel and tire against the brush rotating on longitudinal axis 14 carried by frame 16. Support 22 may be permitted to pivot relative to frame 16 to enable rotating brushes 12 to be moved into pressurized contact with wheels and tires of cars having various "stances" or widths between the tires. Known devices accomplish this motion either through inclined surfaces and gravity movement, pneumatics, or through the use of biasing springs which urge support 22 toward the wheel and tire; surface inclination (in the case of gravity movement) or the force of the springs or pneumatics may be manipulated as desired depending upon the preference of the owner or manufacturer.

Given the length of the rotating brush (a typical length is 8 feet, for example), the speed of the conveyor and the tire diameter, typical conveyor car washes should enable one complete tire revolution or more during the wash. This means the rotating brush will only have relatively limited and brief contact with each tire portion to be cleaned.

Known rotating brushes are either entirely uniform in diameter along their length, or they are "poodle" type brushes. Poodle brushes have a repeating pattern of a squared-off, brush portion length with a constant diameter followed by a squared-off, brush portion length in which shorter brush bristles or filaments (or cloth or foam) are present, as shown in FIGS. 1-5. There are disadvantages with either type of known rotating brush, as now discussed.

Known uniform-diameter rotating brushes do not effectively clean the exterior surfaces of both wheels and tires. The reason is that modern wheels/tires include wheels with largely varying inward slopes and crevices, and may also have wheels with large distance variations between the vertical wheel surface and a fixed interior tire point such as its true center or centroid, in the case of a concave wheel. In other words, some wheels slope so that when viewed from the side, the wheel cannot be seen. Conversely, some wheels slope outwardly. Examples of different wheel types are shown in FIGS. 11-15. A uniform-width rotating brush whose axis is aligned with the vehicle length cannot effectively clean substantially all exterior wheel/tire portions for wheels/tires of different vehicles, because the cleaning portions of the rotating brush either do not touch all such portions, or do not contact them with sufficient force/cleaning penetration.

"Poodle"-type rotating brushes such as shown in prior art FIGS. 1-5 provide better cleaning than uniform-width rotating brushes, but still suffer from disadvantages. Known poodle brushes have filament ends that are squared off, not curvilinear. The valley diameter range for these brushes is believed to have been about 6-8 inches, while the peak diameter range is believed to have been about 11-13 inches. Further, this squared-off shape has been found less effective in cleaning, particularly in cleaning the exterior surfaces of wheels that inwardly slope and/or have significant crevices. Further, past stationary, rotating brushes, whether uniform-width or poodle type, have employed filaments (or cloth or foam elements) that are either too short to provide proper cleaning penetration and/or have an insufficient density providing insufficient cleaning penetration and/or apply insufficient force to be cleaned to provide satisfactory cleaning.

SUMMARY OF THE INVENTION

The objects mentioned above, as well as other objects are solved by the present invention, which overcomes disadvantages of prior rotating brushes for cleaning the outside surfaces of tires/wheels, while providing new advantages not believed associated with such known brushes.

In a preferred embodiment of the present invention, a tire washing apparatus is provided for cleaning exterior surfaces of tire and wheel combinations of a vehicle as the vehicle is conveyed past the apparatus. The tire washing apparatus preferably includes a cleaning elements, such as a brush made of filaments, cloth or foam, rotating about a shaft having a longitudinal axis extending generally parallel to the conveyed direction of the vehicle. The cleaning elements are adapted to clean the exterior surfaces of tire and wheel combinations of the vehicle, and preferably includes an undulating cleaning surface with a repeating pattern of a peak portion followed by a valley portion, with an intermediate portion located between the peak and valley portions having a substantially curvilinear edge surface. In a particularly preferred embodiment, a preferred range for the diameter of the peak portion is about 14-18 inches, while a preferred range for the diameter of the valley portion is about 9-14 inches.

In alternative embodiments, undulating cleaning element may be made of filaments, cloth fingers or closed cell foam, or combinations thereof In one preferred embodiment, the undulating surface employs filaments having a density range of about one-half pound/per linear inch. A preferred shaft diameter is about 1½-2½ inches, a particularly preferred shaft diameter is 1⅞ inches, and a preferred shaft rotational speed is about 100-175 RPMs. The filaments are preferably made of polyethylene, and are preferably generally X-shaped in cross-section, with a preferred specific gravity of between about 0.90-0.93. The filaments preferably have a thickness in the range of about 15-50 thousandths of an inch.

The undulating cleaning element may be a rotating brush with either separate parallel strips, or a spiral wound strip.

In one preferred embodiment, the undulating cleaning elements exert a force of about 15-40 pounds of force over about an 8-foot long brush length on the tire and wheel combinations being cleaned.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Undulating" means a cleaning element, such as a rotating filament-filled brush, or a brush made of other materials such as cloth or closed cell foam, that is generally wave-shaped. The general wave shape may be sinusoidal-shaped or generally so, sawtooth-shaped or generally so, or generally sinusoidal-shaped or generally sawtooth-shaped with flattened wave peaks, etc., provided that the brush diameter has a repeating pattern of a peak portion with a substantial diameter followed by a valley portion having a smaller diameter. Preferably, an intermediate edge between the peak and valley portions is curvilinear, not squared-off, in shape.

BRIEF DESCRIPTION OF THE DRAWINGS

The novel features which are characteristic of the invention are set forth in the appended claims. The invention itself, however, together with further objects and attendant advantages thereof, can be better understood by reference to the following description taken in connection with the accompanying drawings, in which:

FIGS. 10A-10E are side, schematic views of various tire/rim sizes;

FIGS. 12-15 are top and side perspective views of various conventional tires with fitted rims, showing a planar view of wheel contact with the rotating brush of the present invention.

The components in the drawings are not necessarily to scale, emphasis instead being placed upon clearly illustrating the principles of the present invention. In the drawings, like reference numerals designate corresponding parts throughout the several views.

DETAILED DESCRIPTION OF THE PREFERRED EMBODIMENTS

Set forth below is a description of what are believed to be the preferred embodiments and/or best examples of the invention claimed. Future and present alternatives and modifications to this preferred embodiment are contemplated. Any alternatives or modifications which make insubstantial changes in function, in purpose, in structure, or in result are intended to be covered by the claims of this patent.

Figure 1:
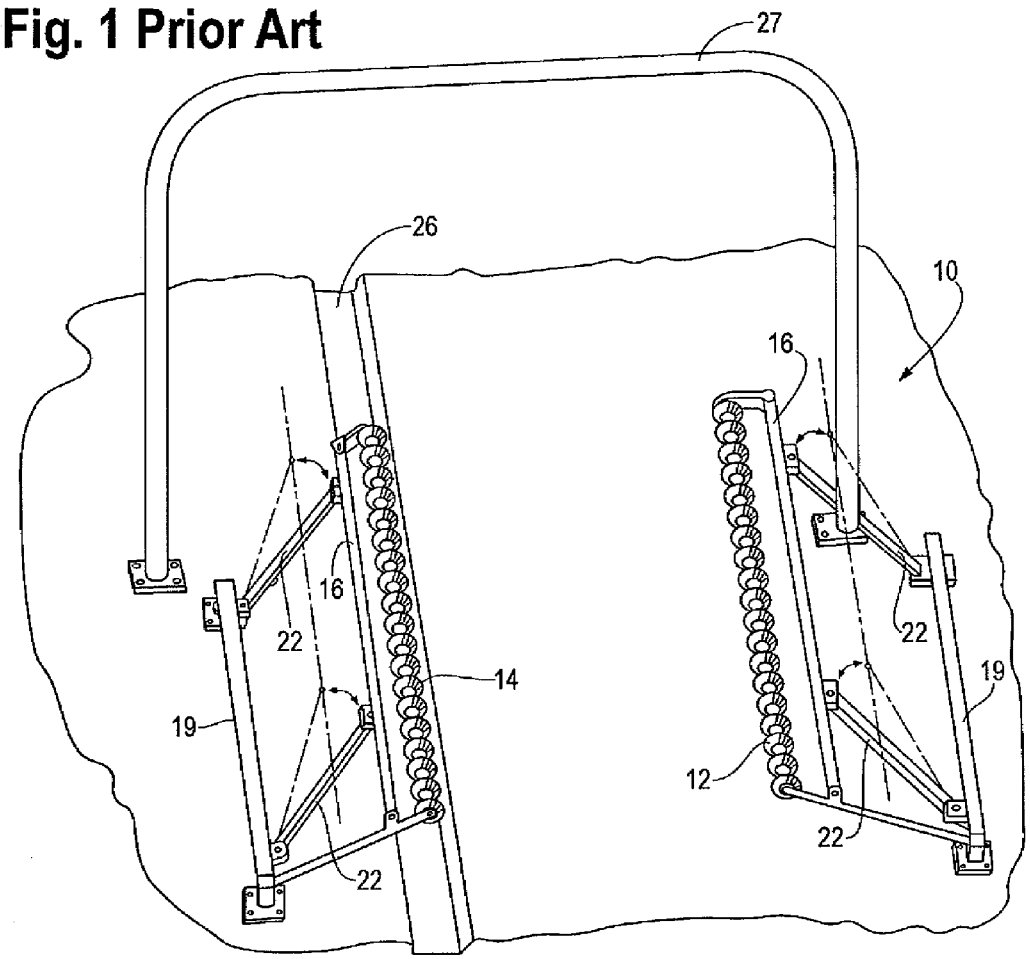
FIG. 1 is a side and top perspective view of a prior art, stationary machine frame supporting a longitudinally-extending, poodle-type brush rotating about its longitudinal axis, for cleaning the outer surface and rim of a tire.
Figure 1A:
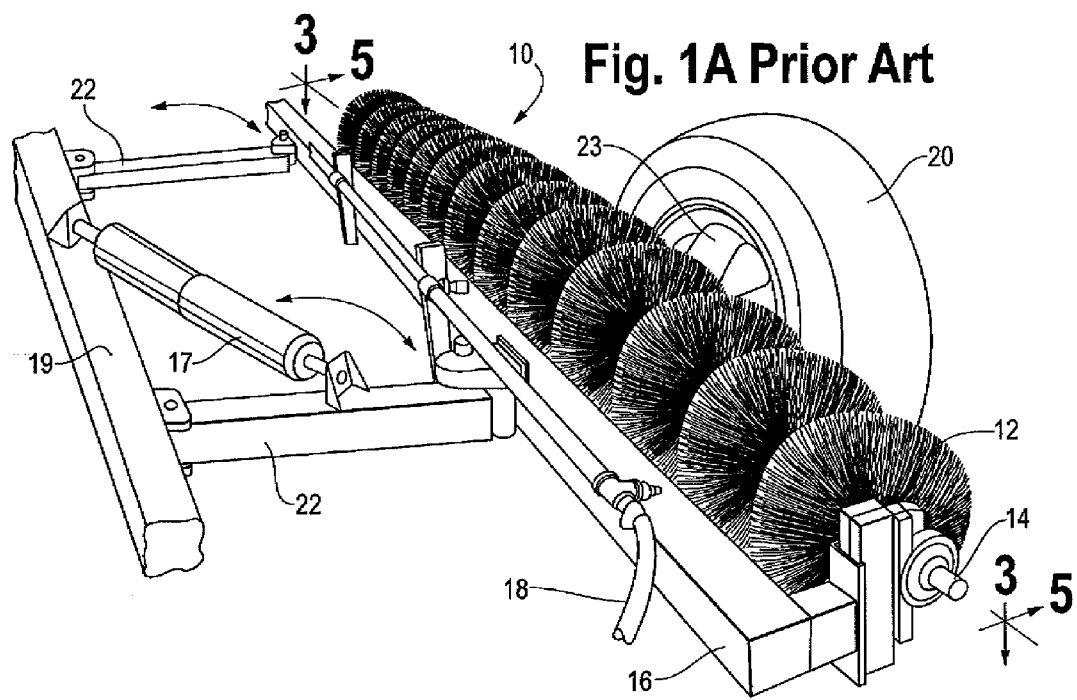
FIG. 1A is an enlarged view of a portion of the device shown in FIGS. 1 and 2-5.
Figure 2:
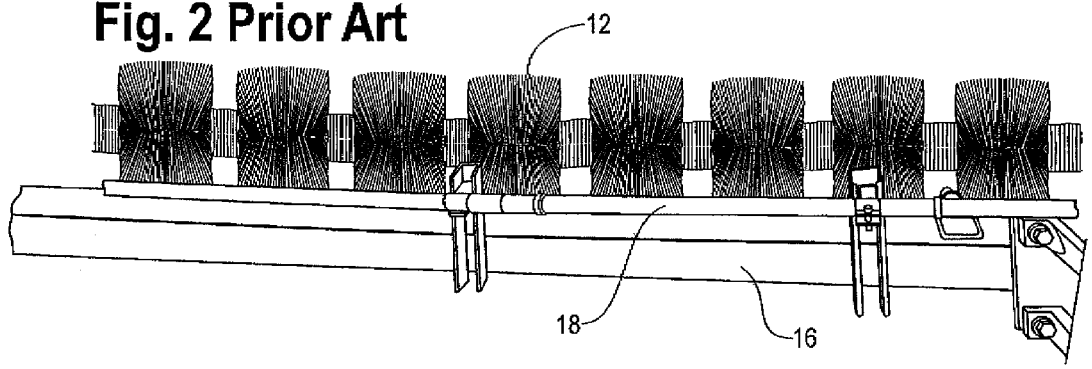
FIG. 2 is a perspective view of a portion of the prior art rotating, poodle-type brush of FIG. 1A.
Figure 3:
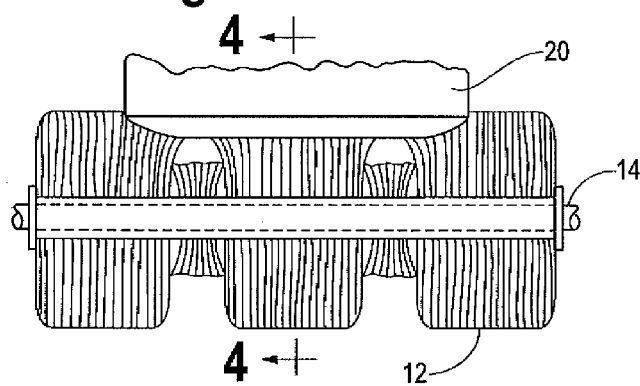
FIG. 3 is a top schematic view of a portion of the prior art rotating brush shown in FIG. 1A, along reference line 3-3.
Figure 4:
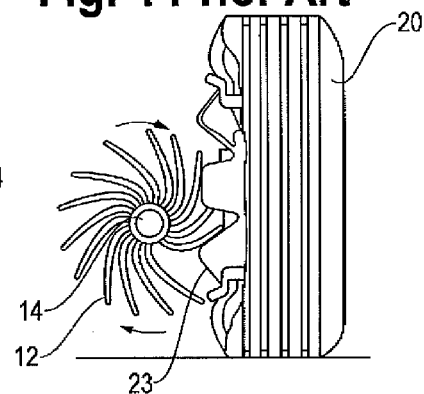
FIG. 4 is a sectional view taken along reference line 4-4 of FIG. 3.
Figure 5:
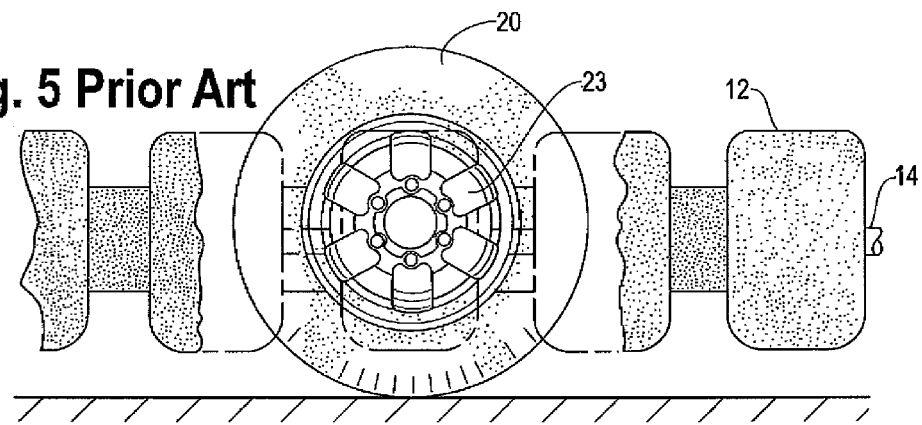
FIG. 5 is a side view of the rotating brush shown in FIG. 1A.
Figure 6:
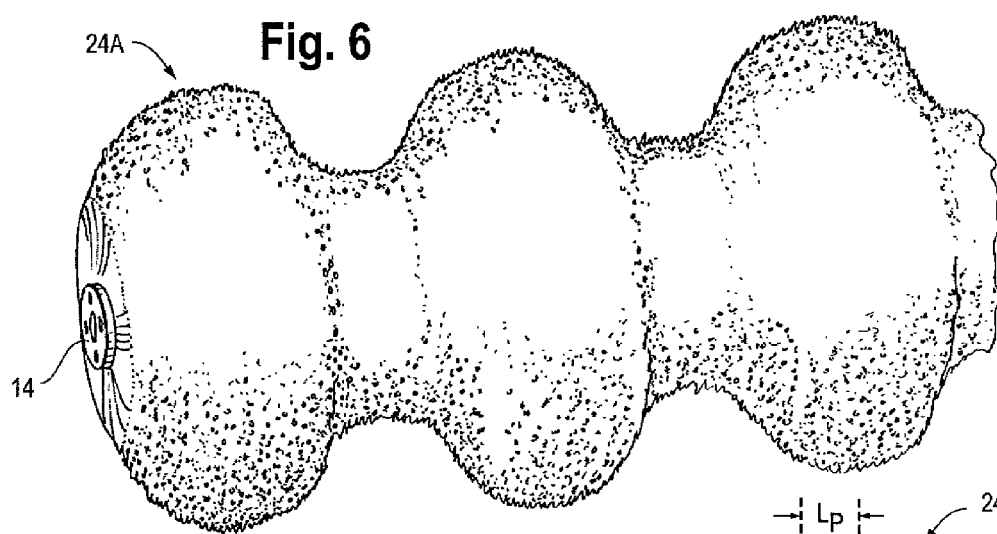
FIG. 6 is a perspective view of one preferred embodiment of the rotating brush of the present invention.

Referring now to FIGS. 6-9, the subject of the present invention is the "undulating" brush 24. Undulating brush 24 may be effectively used in a device such as shown in FIGS. 1-2. In contrast to known prior art rotating brushes, undulating brush 24 includes a repeating pattern of a "peak" portion 24A, and a "valley" portion 24B, in which the peak and valley portions preferably have dimensional ranges as specified here for cleaning the (automobile and small truck) tire sizes addressed here. (In order to clean larger tire sizes than those mentioned here, this will of course require undulating brushes with larger dimensions.)

Using an "undulating" rotating brush as described here, it was surprisingly discovered that superior cleaning characteristics were obtained, as opposed to prior known rotating brushes as described above. (It is noted that satisfactory cleaning also requires the use of an appropriate chemical formulation that is properly applied to the entire outside surface of the outside tire portion and wheel surfaces to be cleaned.)

It was found that the use of an undulating rotating brush with a curvilinear intermediate edge between the peak and valley portions works particularly well. It appears that rotating brushes with squared-off intermediate portions do not clean as well.

It was also found that the density of the cleaning elements of the undulating rotating brush, as well as the pressure they apply on the surfaces to be cleaned, also facilitate superior cleaning, as described below.

Referring to FIGS. 10A-10E, typical tire OD/IDs (in inches) are shown, of: 24/16 (FIG. 10A); 25/20 (FIG. 10B); 16/8 (FIG. 10C); 28.5/16.5 (FIG. 10D); and 32/19 (FIG. 10E). For wheels in this size range, it was found that the following diameter ranges for a brush diameter measured at the peak and valley portions of the undulating brush 24 of the present invention are preferred: for tire sizes for automobiles and small trucks in the tire outside diameter range of 24-32 inches, preferred diameter ranges for diameter Dp (see FIG. 7) measured at peak portion 24A are about 14-18 inches, while preferred diameter ranges for diameter Dv (see FIG. 7) measured at valley portion 24B are about 9-14 inches. (If Dp is 14, Dv is preferably about 9; if Dp is 18, Dv is preferably about 14; other corresponding Dp and Dv numbers may be proportionally derived.)

The undulating brush of the present invention may take various shapes and sizes, such as sinusoidal (FIG. 7) or modified sinusoidal waves, flattened sine waves (FIG. 8), sawtooth waves (FIG. 9), etc., provided that there is an "undulating" characteristic to the brush length (i.e., peak portions followed by valley portions). The common characteristic of these undulating brush shapes is that the cleaning element peak and valley diameters and lengths should be sufficient to provide desirable cleaning.

The cleaning surface of the rotating brush may be made of filaments, cloth, or closed cell foam. If filaments are used, they may be "X-shaped" in cross-section, have a thickness in the range of about 15-50 thousandths of an inch, and are made of low density polyethylene. (Polypropylene or nylon could be used, but these are harder materials which may scratch the vehicle exterior and nylon may not be economical to use.)

The shaft carrying the rotating brush preferably has a smaller diameter conventional such shafts (about 1½-1⅞ inches, for example, instead of 2¼-2½ inches). (As the shaft diameter decreases, longer filaments may be used for the same outside brush diameter.) The present invention is currently believed to preferably use a filament density of about one-half pound/linear inch of length measured at the core/shaft, whereas prior art brushes are believed to employ lower filament densities of roughly about one-half or three-quarters of this preferred density. In other words, for an 8-foot long brush, the undulating brush of the present invention may have about 48 pounds of polyethylene filament. This density may vary depending upon the type of material and the length of cleaning elements (e.g., filaments) selected.

Sufficient force must also be exerted on surfaces to be cleaned by the rotating brush to provide sufficient penetration into the surfaces of the tire and wheel to be cleaned. This force is a function of the distances of the shaft from the wheel/tire to be cleaned, as well as the shaft RPM. A faster shaft RPM actually results in less brush penetration into the surfaces to be cleaned. A preferred range is currently believed to be about 100-175 RPMs, with about 15-40 pounds of force exerted over the (e.g.) 8-foot rotating brush length. Shaft rotational speed and overall brush diameter can substantially influence the distance between the brush cleaning element ends and the surfaces to be cleaned. (The higher the RPM or the larger the overall brush diameter, the greater the force needed, i.e., the brush can be "tuned" by varying the shaft distance and/or the RPMs for best cleaning results.)

Figure 7:
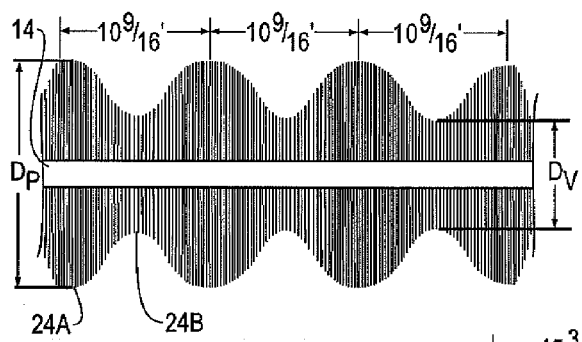
Figure 9:
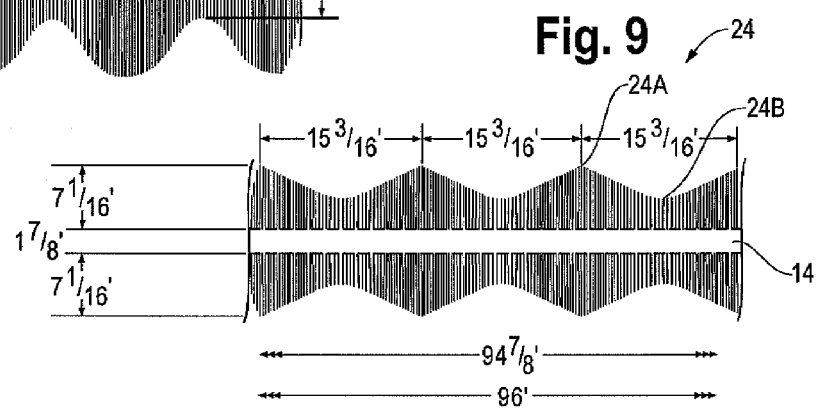
Figure 11:
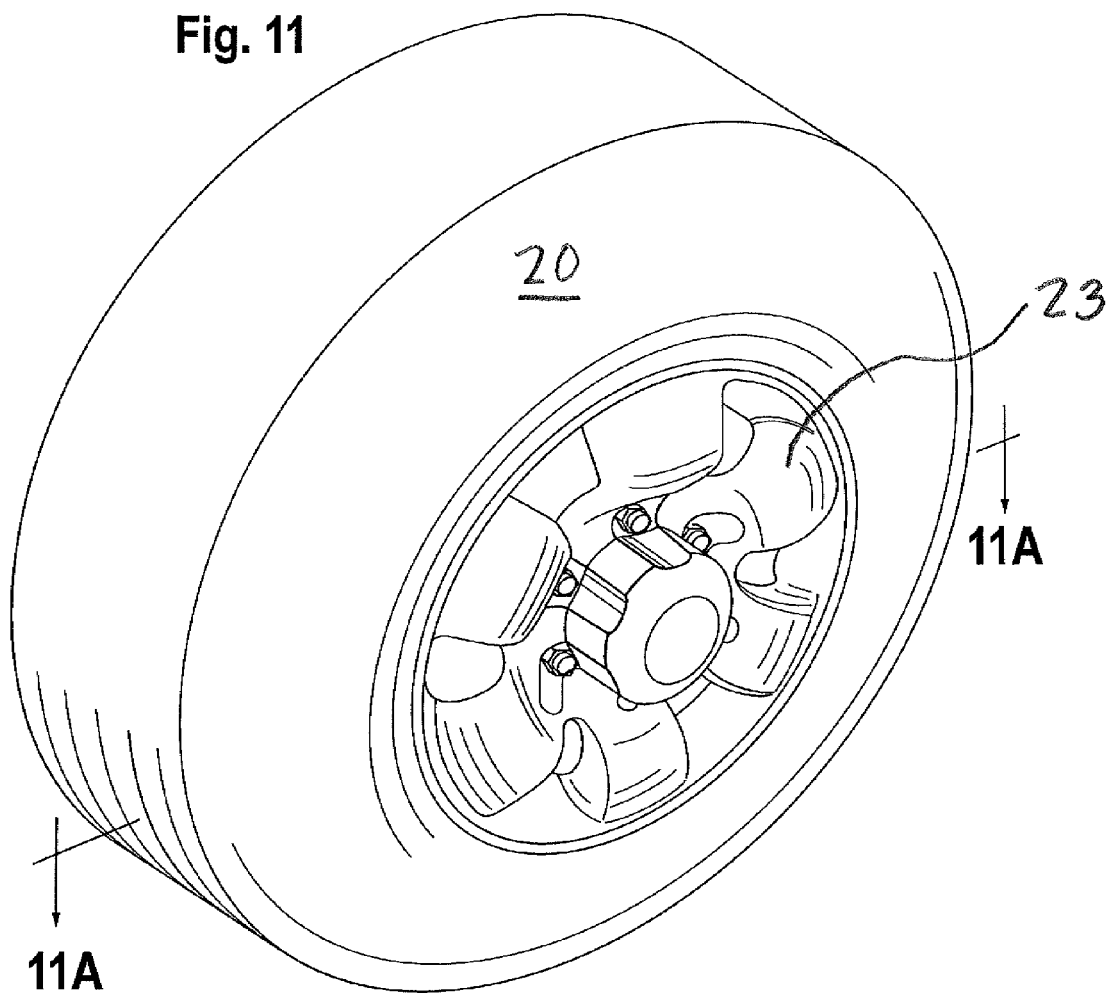
FIG. 11 is a top and side perspective view of a conventional tire and wheel.
Figure 11A:
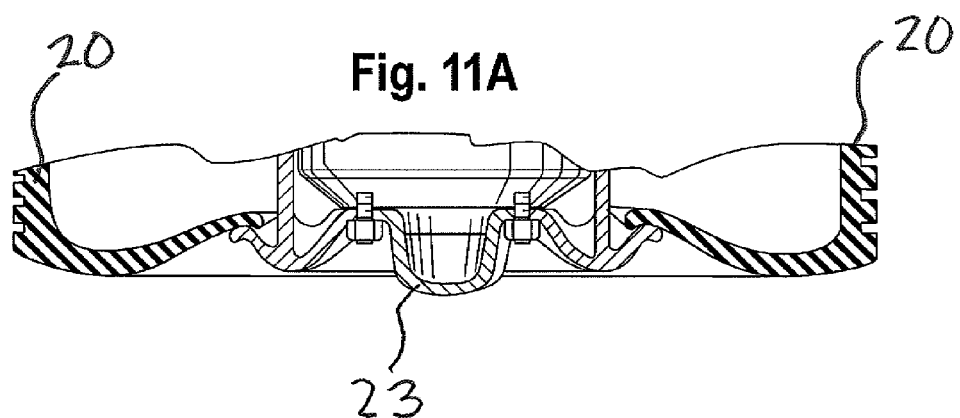
FIG. 11A is a sectional view along reference line 11A-11A of FIG. 11.
Figure 14:
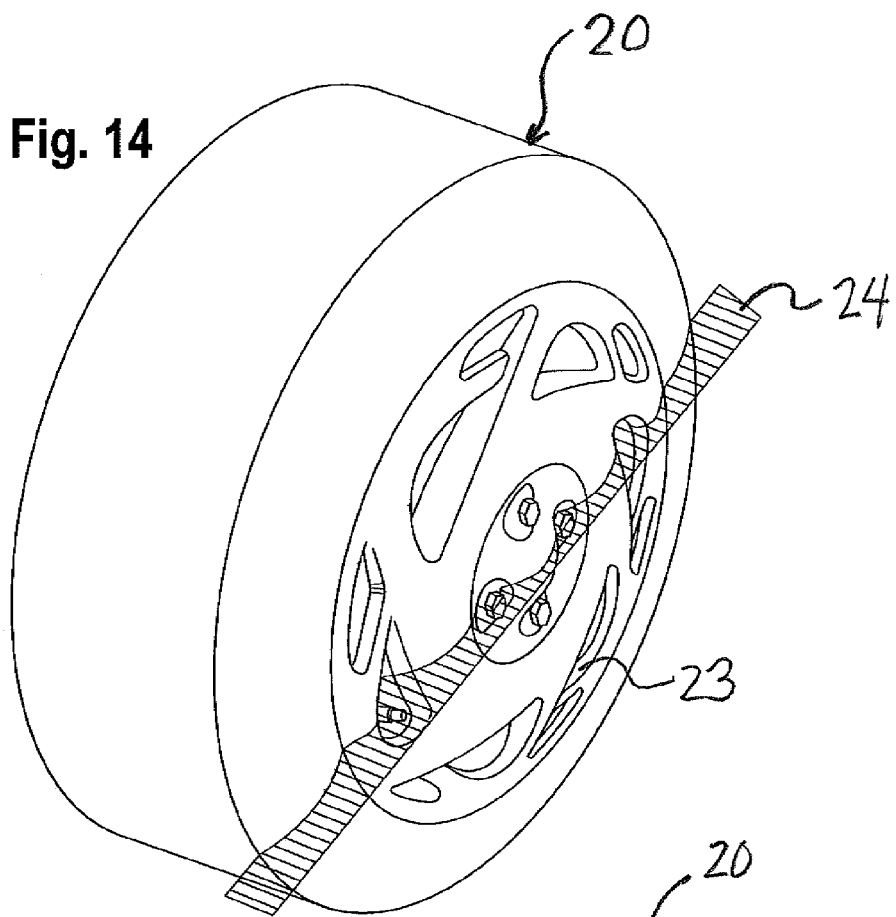
Figure 15:
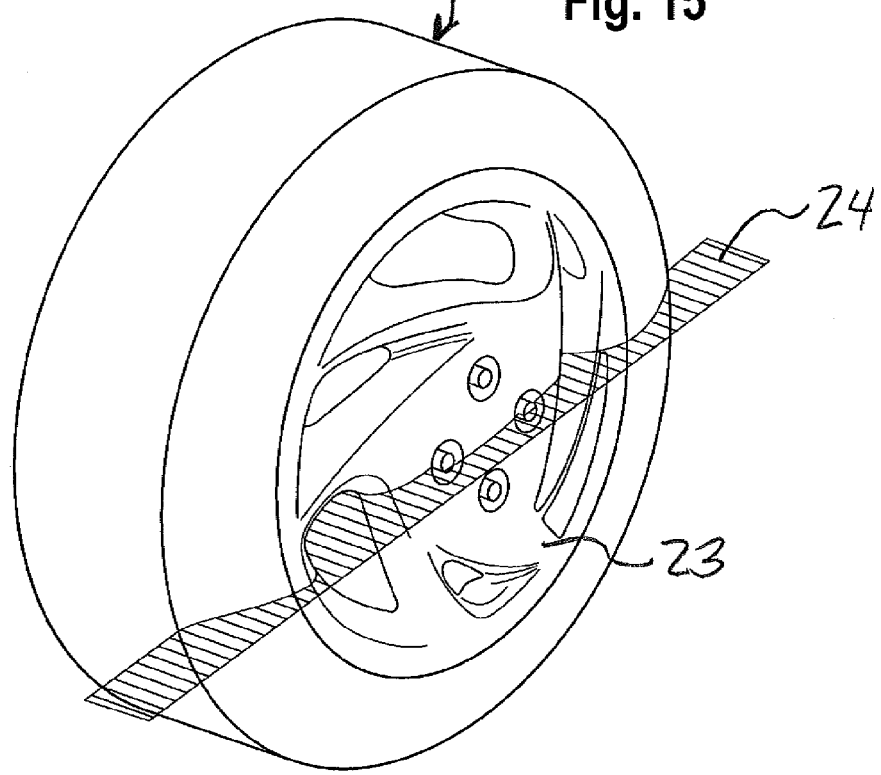

Referring to FIG. 7, in a particularly preferred embodiment, it was found that satisfactory cleaning was achieved when using about 15-50 thousandths of an inch, X-shaped polyethylene filaments with a peak wave diameter Dp at peak 24A of about 18 inches and a valley height diameter Dv at valley 24B of about 14 inches, that exerted about 15-35 pounds of force exerted on the 96-inch long brush as measured by a Grainger push-pull gauge scale. Based on visual observation, assuming adequate cleaning chemical coverage, satisfactory cleaning was achieved over roughly 90-99 percent of the exterior surfaces of the tire and wheel, as compared to about 70 percent for a comparable uniform-width brush and about 80 percent for a comparable poodle brush.

Figure 8:
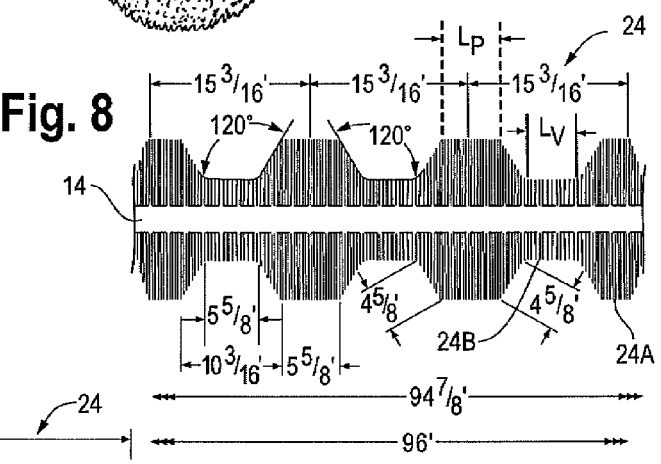
FIGS. 7-9 are partial side views of various preferred embodiments of the rotating brush of the present invention.

Referring to FIG. 8, in a particularly preferred embodiment, the length of the peak portion Lp is preferably longer than the length of the valley portion Lv, such as in about a 1-2:1 ratio. In alternative, less-preferred embodiments, Lv may be about equal to or less than Lp.

While the preferred embodiment of the invention has been discussed above with regard to undulating, rotating brush elements made of filaments, those of ordinary skill in the art will appreciate that the foregoing inventive principles may be applied with brush elements made of cloth or closed cell foam, as is well known in the art to be used. It will also be understood that the undulating, rotating brush of the present invention may include parallel strips, or a spiral wound strip, and may include individually drawn brush elements or tufts, or stapled brush elements.

The above description is not intended to limit the meaning of the words used in the following claims that define the invention. Persons of ordinary skill in the art will understand that a variety of other designs still falling within the scope of the following claims may be envisioned and used. It is contemplated that future modifications in structure, function, or result will exist that are not substantial changes and that all such insubstantial changes in what is claimed are intended to be covered by the claims.

I claim:

1. A wheel washing apparatus for cleaning exterior wheel surfaces of tire and wheel combinations of a vehicle as the vehicle is conveyed past the apparatus, wherein the wheel constitutes the rigid rim portion of the tire and wheel combination which is mounted to the vehicle axle, comprising:

a single longitudinally-extending cleaning element rotation about a shaft having a longitudinal axis extending generally parallel to the conveyed direction of the vehicle, the cleaning element being comprised wholly of elements which are nonabrasive to the exterior wheel surfaces of the of the tire and wheel combinations of the vehicle, and being adapted to clean the exterior wheel surfaces of the tire and wheel combinations of the vehicle;

the cleaning element having an undulating cleaning surface with a repeating pattern of a peak portion followed by a valley portion; and the cleaning element further comprising an intermediate portion located between the peak and valley portions, the intermediate portion having a substantially curvilinear edge surface, wherein the cleaning element presents a variable cleaning surface for cleaning the varying surfaces and shapes of the wheel surfaces of different vehicles as the vehicles are passed in a longitudinal direction which is substantially parallel to the longitudinal axis of the cleaning element.

2. The wheel washing apparatus of claim 1, wherein the peak portion has a peak diameter in the range of about 14-18 inches.

3. The wheel washing apparatus of claim 1, wherein the valley portion has a valley diameter in the range of about 9-14 inches.

4. The wheel washing apparatus of claim 1, wherein the undulating surface of the cleaning element is comprised of nonabrasive filaments.

5. The wheel washing apparatus of claim 4, wherein the undulating surface comprises filaments having a density range of about one-half pounds/linear inch.

6. The wheel washing apparatus of claim 4, wherein the filaments are comprised of polyethylene.

7. The wheel washing apparatus of claim 6, wherein the polyethylene has a specific gravity of between about 0.90-0.93.

8. The wheel washing apparatus of claim 4, wherein the filaments are generally X-shaped in cross-section.

9. The wheel washing apparatus of claim 4, wherein the filaments have a thickness in the range of about 15-50 thousandths of an inch.

10. The wheel washing apparatus of claim 4, wherein the filaments are comprised of one or more of the following: polyethylene; polypropylene; or nylon.

11. The wheel washing apparatus of claim 1, wherein the undulating surface of the cleaning element is comprised of cloth.

12. The wheel washing apparatus of claim 1, wherein the undulating surface of the cleaning element is comprised of closed cell foam.

13. The wheel washing apparatus of claim 1, wherein the shaft rotates at a speed of about 100-175 RPMs.

14. The wheel washing apparatus of claim 1, wherein the shaft has a diameter in the range of about 1½-2½ inches.

15. The wheel washing apparatus of claim 1, wherein undulating cleaning element comprises a rotating brush made using at least one of the following elements, methods or techniques: parallel strips; a spiral wound strip; or hand drawn; or stapled.

16. The wheel washing apparatus of claim 1, wherein the undulating cleaning elements exert a force of about 15-35 pounds over about an 8-foot long brush length on the tire and wheel combinations being cleaned.

17. The wheel washing apparatus of claim 1, wherein the undulating cleaning elements have a peak portion length measured along the longitudinal axis of the shaft which is about 1-2 times longer than a corresponding valley portion length.

18. A wheel washing apparatus for cleaning exterior wheel surfaces of tire and wheel combinations of a vehicle as the vehicle is conveyed past the apparatus, wherein the wheel constitutes the rigid rim portion of the tire and wheel combination which is mounted to the vehicle axle, comprising;

a longitudinally-extending cleaning element rotating about a single shaft having a longitudinal axis extending generally parallel to the conveyed direction of the vehicle, the cleaning element being nonabrasive and adapted to clean the exterior wheel surfaces of the tire and wheel combinations of the vehicle; the cleaning element being comprised wholly of elements which are nonabrasive to the exterior wheel surface and having an undulating cleaning surface with a repeating pattern of a peak portion having a peak diameter followed by a valley portion with a valley diameter that is less than the peak diameter, and further comprising an intermediate portion located between the peak and valley portions, the intermediate portion having a substantially curvilinear edge surface, wherein the cleaning element present a variable cleaning surface for cleaning the varying surface and shapes of the rigid wheel surface of different vehicles are passed in a longitudinal direction which is substantially parallel to the longitudinal axis of the cleaning element.

* * * * *